（12) United States Patent
Didcock et al.

(10) Patent No.: US 11,899,414 B2
(45) Date of Patent: Feb. 13, 2024

(54) METHOD FOR CALIBRATING A TECHNICAL SYSTEM

(71) Applicant: AVL LIST GMBH, Graz (AT)

(72) Inventors: Nico Didcock, Graz (AT); Alexander Wasserburger, Vienna (AT); Christoph Hametner, Vienna (AT)

(73) Assignee: AVL LIST GMBH, Graz (AT)

( * ) Notice: Subject to any disclaimer, the term of this patent is extended or adjusted under 35 U.S.C. 154(b) by 420 days.

(21) Appl. No.: 17/311,966

(22) PCT Filed: Dec. 9, 2019

(86) PCT No.: PCT/AT2019/060422
§ 371 (c)(1),
(2) Date: Jun. 8, 2021

(87) PCT Pub. No.: WO2020/118330
PCT Pub. Date: Jun. 18, 2020

(65) Prior Publication Data
US 2022/0026863 A1    Jan. 27, 2022

(30) Foreign Application Priority Data
Dec. 10, 2018   (AT) .............. A 51095/2018

(51) Int. Cl.
  *G05B 13/04* (2006.01)
  *G05B 1/03* (2006.01)
  *G06F 17/18* (2006.01)
(52) U.S. Cl.
  CPC ............. *G05B 13/041* (2013.01); *G05B 1/03* (2013.01); *G06F 17/18* (2013.01)
(58) Field of Classification Search
  None
  See application file for complete search history.

(56) References Cited

U.S. PATENT DOCUMENTS 9,760,532 B2   9/2017 Wallner et al.
2009/0306866 A1* 12/2009 Malikopoulos ... B60W 30/1882
                                        701/59
(Continued)

FOREIGN PATENT DOCUMENTS

| CN | 107856670 B | 3/2019 |
| EP | 1703110 A1 | 9/2006 |
| WO | 2017198638 A1 | 11/2017 |

OTHER PUBLICATIONS

Christoph Hametner et al: "Nonlinear System Identiication through Local Model Approaches: Partitioning Strategies and Parameter Estimation 179 0 Nonlinear System Identification through Local Model Approaches: Partitioning Strategies and Parameter Estimation", Jan. 1, 2010 (Jan. 1, 2010), XP055280761, Retrieved from the Internet <URL:http://cdn.intechopen.com/pdfs-wm/11739.pdf> [retrieved on Jun. 15, 2016].

(Continued)

*Primary Examiner* — Ryan A Jarrett
(74) *Attorney, Agent, or Firm* — Dykema Gossett PLLC

(57) ABSTRACT

Various aspects of the present disclosure are directed to methods for calibrating a technical system with respect to stochastic influences during real operation of the technical system. In one example embodiment of the present disclosure, the method includes the steps of: determining the values of a number of control variables, carrying out the calibration on the basis of a load cycle which results in a sequence of a number of operating points, executing the load cycle multiple times under the influence of at least one random influencing variable, with each realization of the load cycle resulting in a random sequence of the number i of operating points, defining a risk measure of the probability distribution, with which the probability distribution is mapped to a scalar variable, and optimizing the risk measure (Continued)

by varying the number of control variables in order to obtain optimal control variables for calibration.

11 Claims, 4 Drawing Sheets

(56) References Cited

U.S. PATENT DOCUMENTS

2016/0363913 A1* 12/2016 Pfeiffer .............. G05B 23/0294
2018/0112580 A1   4/2018 Suljanovic et al.
2018/0113963 A1   4/2018 Kordon et al.

OTHER PUBLICATIONS

Heiko Sequenz: "Emission Modelling and Model-Based Optimisation of the Engine Control", Feb. 25, 2013 (Feb. 25, 2013), Darmstadt, germany, XP055281312, Retrieved from the Internet <URL:http://tuprints ulb.tu-darmstadt.de/3948/1/Emission Modelling and Model-Based Optimisation of the Engine Control - Dissertation Heiko Sequenz.pdf> [retrieved on Jun. 16, 2016].

* cited by examiner

METHOD FOR CALIBRATING A TECHNICAL SYSTEM

CROSS-REFERENCE TO RELATED APPLICATIONS

This application is a national stage filing based upon International PCT Application No. PCT/AT2019/060422, filed 9 Dec. 2019, which claims the benefit of priority to Austria application No. A 51095/2018, filed 10 Dec. 2018.

BACKGROUND

The present invention relates to a method for calibrating a technical system, wherein, during the calibration, the values of a number of control variables of the technical system, with which the technical system is controlled or tuned, are determined at specific operating points of the technical system and the calibration is carried out on the basis of a load cycle for the technical system which results in a sequence of a number of operating points of the technical system.

It is often a problem to optimize a technical system with regard to a specific behavior and on the basis of a specific operating point. During such an optimization, control variables of the technical system are usually varied at a specific operating point and the effect on the specific behavior is checked. Control variables are variables by means of which the technical system is regulated, controlled or tuned. The operating point can be characterized by state variables that occur depending on the control variables, and possibly depending on current external influences (such as a load, ambient conditions (e.g. ambient temperature, wind, humidity, atmospheric pressure), etc.). The effect is usually checked on the basis of at least one output variable of the technical system, which can be measured or calculated using models. The control variables that provide the best behavior, which is checked according to a specified criterion, are stored for this operating point or the technical system is tuned with them in order to operate the technical system with them during normal operation. This can be repeated for different operating points in order to obtain the optimal control variables over a specific operating range of the technical system, preferably the entire operating range. The operating points for which the control variables are optimized are often predetermined. The optimized control variables are often also stored in so-called characteristic maps as a function of the operating point, for example in control units for controlling the technical system. Such an optimization of the technical system is also referred to as calibration.

In particular any component of a machine, e.g. of a vehicle, of which the operation can be influenced by control variables (e.g. by controlling or by a specific setting) is thus suitable as a technical system for the calibration.

A typical example is the calibration of an internal combustion engine. When calibrating an internal combustion engine, it is generally a matter of setting specific predetermined control variables of the internal combustion engine on the basis of the operating point of the internal combustion engine such that certain specifications, such as emission limits or consumption limits (output variables, in general), are complied with. Control variables in this case are, for example, an ignition time, an injection time (e.g. pre-injection, post-injection), the amount of recirculated exhaust gas from an EGR (exhaust gas recirculation), the position of a throttle valve, etc. Typical state variables of an internal combustion engine are speed and torque. An operating point is thus given, for example, by the speed and the torque, possibly under specific ambient conditions.

Other examples of a technical system which can be calibrated is a transmission application with a transmission control unit (TCU) or a hybrid application with a hybrid control unit and/or a battery management system. Further examples are the air conditioning system of a vehicle or an electronically controllable suspension. In principle, any mechatronic system can be calibrated as a technical system controlled by a control unit. Typical examples of components of a vehicle that are controlled by associated control units are, in addition to the internal combustion engine, a transmission, a drive battery, brakes, a drive train, a wheel suspension, etc.

However, calibration can also be used to optimize the behavior of a technical system, such as a vehicle or a component of a vehicle. For example, the driving characteristics of a vehicle (e.g. noise, chassis, damping, switching behavior, steering, air conditioning, etc.) are frequently optimized with regard to desired characteristics by calibration. Examples include damping optimization, transmission optimization, clutch optimization or the adjustment of a vehicle steering system. The control variables are therefore specific settings on the technical system with which the technical system is tuned or operated. For example, the rigidity of a chassis can be optimized by varying the spring parameters (control variables) in chassis bearings in order to influence or optimize specific output variables, such as driving dynamics or driving comfort. Another example is a hydrodynamic coupling, wherein the coupling filling process is optimized, or the adjustment of the behavior or characteristics of a vehicle steering system.

The selection of the operating points for which the calibration is carried out is of course decisive for the calibration. These operating points are usually predetermined, often by law. For example, so-called driving cycles are defined for vehicles, which can be used to demonstrate certain characteristics of a component of the vehicle, for example the consumption or the emission behavior of an internal combustion engine. Well-known driving cycles are the New European Driving Cycle (NEDC) or the Worldwide Harmonized Light Vehicles Test Cycle (WLTC). A driving cycle is usually a speed-time diagram (analogously also position-time diagram) according to which the vehicle is moved on the roller test bench, or a vehicle component is operated on a component test bench (for example an internal combustion engine on an engine test bench). If a vehicle component, e.g. a drive train or an internal combustion engine, is operated on a component test bench, e.g. a drive train test bench or an engine test bench, then the driving cycle is used to simulate the movement of the vehicle in order to calculate, from the simulation, control variables for the operation of the vehicle component and usually also for a load machine connected to the vehicle component on the test bench. A model-based calibration is also often carried out, in which the investigated system behavior of the technical system is approximated by a model. The output variables to be optimized are calculated from the model on the basis of the predetermined operating points according to the load cycle. In general, reference is made to a load cycle for a technical system, to which the technical system is subjected for calibration. Specific output variables, such as consumption or emissions, are also measured over the load cycle and assessed with regard to compliance with legal requirements.

The operating points should usually cover the entire operating range of the technical system as well as possible, for example, in the case of a vehicle, the entire possible range of the speed and torque of the internal combustion engine. At the intended operating points, the intended output variable of the technical system is optimized (minimized or maximized) via the intended control variables, so that values of the control variables (interpolation points) that are discretely distributed over the operating range are obtained. On the basis of the interpolation points, a characteristic map is then spun over the entire operating range in order to also cover the areas between the interpolation points. Since sudden or discontinuous changes to the control variables are usually undesirable in normal operation, a characteristic map is usually also smoothed.

Especially in the context of vehicles as a technical system, cycle-based characteristic values are also often determined, for example the total consumption or the total amount of soot in the exhaust gas or the total NOx and/or HC emissions in the exhaust gas over the entire load cycle. Such a cycle-based characteristic value is determined, for example, as the sum of the values at the individual operating points for which calibration takes place. The calibration may also require optimization of such cycle-based characteristic values, for example in order to demonstrate compliance with permissible limit values.

The major disadvantage of this type of calibration is that the calibration is always carried out on the basis of a specific, predetermined load cycle. The technical system is thus well calibrated for this load cycle (and for similar load cycles). This may not necessarily be the case for load cycles during real operation, which can deviate to a greater or lesser extent from the load cycle for which the calibration was carried out. This means that the output variable during real operation can also exhibit undesirable, even large, deviations. The calibration is also carried out in a specific environment, for example on a test bench, where specific environmental conditions (temperature, pressure, climate, etc.) prevail. However, the environmental conditions of the technical system during real operation can also differ from the conditions on the test bench. This can also lead to undesirable, even large, deviations in the output variable. However, these influences cannot be eliminated by a conventional calibration, or only with a great deal of effort.

It is therefore an object of the present invention to provide a method for calibrating a technical system that is more robust with respect to influences during real operation of the technical system.

SUMMARY OF THE INVENTION

This object is achieved according to the invention in that the load cycle is executed multiple times under the influence of at least one random influencing variable, with each realization of the load cycle resulting in a random sequence of the number of operating points, in that a cost function is defined which is dependent on the number of control variables of the technical system and on the number of random operating points of the technical system and which contains at least one target function with a model for an output variable of the technical system so that the value of the cost function for each realization of the load cycle is itself a random variable that has a probability distribution, in that a risk measure of the probability distribution is defined, with which the probability distribution is mapped to a scalar variable, and in that the risk measure is optimized by varying the number of control variables in order to obtain the optimal control variables. By optimizing the deterministic risk measure, the inherently stochastic cost function can be optimized with regard to the control variables, as a result of which the optimization becomes more robust against random influences or random influences are taken into account in the optimization.

The cost function advantageously contains a number of restrictions with a model of an output variable of the technical system that is to be restricted, which makes it possible to take such restrictions into account directly in the optimization. This is particularly advantageous if restrictions of an output variable of the technical system are to be taken into account over the entire load cycle.

For optimization, the number of control variables is preferably varied iteratively and the probability distribution of the cost function is determined again until the risk measure of the probability distribution is optimized. A boundary condition and/or constraint for the number of control variables is advantageously taken into account hereby.

BRIEF DESCRIPTION OF THE DRAWINGS

In the following, the present invention is described in greater detail with reference to FIGS. 1 to 6 which, by way of example, show schematic and non-limiting advantageous embodiments of the invention. In the drawings.

DETAILED DESCRIPTION

Figure 1:
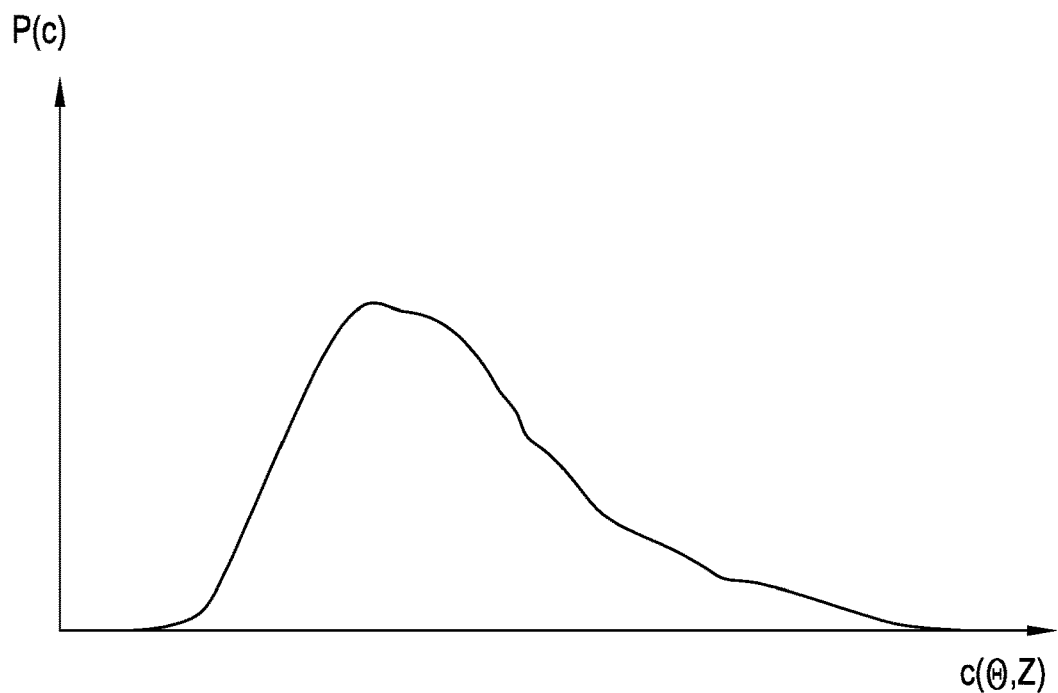
FIG. 1 shows a probability distribution of a stochastic cost function.

The invention is based on the assumption that the technical system, for example a (land, air, water) vehicle, an internal combustion engine, a hybrid drive train, a transmission, an exhaust gas aftertreatment system of a vehicle, a battery, etc. is not to be calibrated on the basis of a single defined load cycle in a model-based manner as was previously the case. A load cycle defines the operation of the technical system over a certain period of time and, when executed, leads to specific operating points of the technical system in this period of time. For example, in the case of automotive components as the technical system, a defined driving cycle, e.g. NEDC, WLTC, etc., is often used as a load cycle in the form of a time curve of a vehicle speed. If the vehicle follows this time curve of the vehicle speed, for example on a roller test bench or also in a simulation of the driving of the vehicle, this results in specific operating points within the possible operating range in the time period of the load cycle, for example as a combination of speed and torque of the internal combustion engine or as a combination of electric current and electric voltage of an electric motor or a battery of a hybrid or electric vehicle. The calibration of the technical system is aimed at optimizing (generally minimizing or maximizing) at least one output variable of the technical system that occurs during the execution of the load cycle, for example consumption or emission, with respect to certain criteria. In addition, compliance with limit values of cycle-based characteristic values, for example the total soot emission during the load cycle or the NOx or HC emission during the entire load cycle, or the total consumption, is also required.

For the model-based calibration, a target function y is defined which is to be optimized, that is to say, either minimized or maximized. The target function y can be written as follows:

$$y = \sum_{i=1 \ldots M} f(x_i, \theta_i) \cdot w_{fi}.$$

Here, f denotes the known or predetermined model for calculating an output variable to be optimized, for example the consumption or emissions of an internal combustion engine. $x_i$ denotes the i-th operating point (i=1 ... M) which is predetermined by the load cycle, $\theta_i$ denotes the control variables with which the technical system is controlled or tuned in the i-th operating point and $w_{fi}$ denotes weightings for the i-th operating point. The weightings $w_{fi}$ evaluate the importance of specific operating points and are known or predetermined. For example, specific operating points will occur more frequently than others, which can then be weighted higher. In the simplest case, the weightings $w_{fi}$ can also be assumed to be one ($w_{fi}$=1). The model f can be any mathematical or physical model, for example a neural network, a linear model network, a functional relationship, etc. In order to take into account the compliance with limit values of cycle-based characteristic values, k=1 . . . K restrictions $B_k$ in the manner of $$\underbrace{\sum_{i=1 \ldots M} g_k(x_i, \theta_i) \cdot w_{gki} \leq G_k}_{B_k}$$

can also be taken into account in the calibration. Here, $g_k$ describes a model for the k-th variable to be restricted, which is also an output variable of the technical system 1, for example soot emission, consumption, NOx or HC emissions, etc., and $w_{gki}$ again denotes known weightings, which in the simplest case can also be assumed to be one again. Such a restriction $B_k$ thus evaluates an output variable over the entire load cycle by adding up the values of the output variable over the number i of operating points $x_i$. Multiple restrictions $B_k$ can also be taken into account simultaneously. $G_k$ is the predetermined limit value for the k-th variable to be restricted. In a restriction $B_k$ and in the target function y, the same output variable can also be evaluated, which means that for the k-th restriction $B_k$, $g_k$=f can also apply, and thus also $w_{fi}$=$w_{gki}$.

The optimization can then be carried out, for example, as before in general in the form of $$\theta = \min_{\theta} / \max y,$$

if necessary, with the k restrictions $B_k$ as a constraint. In other words, the control variables $\theta$ are varied in order to minimize or maximize the target function y and, if necessary, at the same time ensure compliance with the restrictions.

Often a cost function c is defined for the calibration from the target function y and the restrictions $B_k$, which cost function is then optimized. For the sake of simplicity, the k restrictions $B_k$ can be integrated into the cost function c via a sum. The cost function c can for example be written in the form $$c(\theta) = \sum_{i=1 \ldots M} \left\{ f(x_i, \theta_i) \cdot w_{fi} \cdot c_f + \varphi \left( \sum_{k=1 \ldots K} [g_k(x_i, \theta_i) \cdot w_{gki} - G_k]^+ \cdot c_{gk} \right) \right\}.$$

This cost function c is then optimized, $$\theta = \min_{\theta} / \max c(\theta).$$

Costs $c_f$ can also be taken into account in order to weight the costs incurred for the output variable that is determined by the model f. Likewise, costs $c_{gk}$ can be taken into account for the restrictions $B_k$, which however only arise if the restriction $B_k$ is violated, which is described in the cost function by the expression $[h]^+$=max$\{0,h\}$. The costs $c_f$, $c_{gk}$ can be defined or are predetermined. The violation of a restriction $B_k$ could additionally and optionally be evaluated by a predetermined penalty function $\varphi$. For example, $\varphi(x)$=x could be set as the penalty function, which means that $\varphi$ would practically not occur in the cost function. Another possible penalty function is, for example, $\varphi(x)$=$x^2$ in order to quadratically penalize a violation of the restriction $B_k$. Of course, a multitude of other penalty functions $\varphi$ are also conceivable. In the cost function c, however, only the target function y can be taken into account, and the term with the restrictions $g_k$ would be omitted. This optimization problem can then be solved on a computing unit (hardware with software) for a specific load cycle using existing solution algorithms.

In this calibration, however, ambient variables of the technical system during real operation, such as the ambient temperature, the ambient pressure, the air humidity, weather conditions (rain, ice, snow, sun, wind, etc.), etc., are not taken into account. In addition, the ambient variables during real operation are typically not constants, but random variables. In addition to the ambient variables, there are other influencing variables that are random during real operation. Examples of this are control uncertainties, sensor or actuator uncertainties, model uncertainties or tuning uncertainties. The control variables $\theta$ are usually set by means of a controller during real operation of the technical system. This naturally leads to control uncertainties (limited rise times, overshoots, control errors, etc.) and so the actually realized control variable can deviate from the desired target variable. For every control, sensors are also required to record actual variables, and actuators are required in order to actually be able to set the control variable on the technical system. The accuracy of the sensors and actuators is also limited, which leads to actuator uncertainties. Each model is only an approximation of reality, and so this also results in model uncertainties. If control variables are used to tune the technical system 1, the tuning results in tuning uncertainties. There are thus random influencing variables Z that influence the operation of the technical system 1. A random influencing variable Z is thus a random variable on which the target function y and/or a restriction $g_k$, or the cost function c, is dependent. If such random influencing variables Z are taken into account in the target function y and/or in the restrictions $g_k$ for calibration, the target function y and/or the restriction $g_k$, as well as a cost function c formed therefrom, is itself no longer deterministic, but also stochastic, i.e. random. However, this means that the optimization for the calibration can no longer be solved with conventional solution algorithms for solving the optimization problem. The influence of such random influencing variables Z on the calibration of the technical system has therefore not been taken into account so far.

The cost function c, taking into account random influencing variables Z, can then, for example, be written in the form $$c(\theta, Z) = \sum_{i=1\ldots M} \left\{ f(x_i, \theta_i, Z) \cdot w_{fi} \cdot c_f + \varphi\left( \sum_{k=1\ldots K} [g_k(x_i, \theta_i, Z) \cdot w_{gki} - G_k]^+ \cdot c_{gk} \right) \right\},$$

the term with the restrictions $B_k$ being optional again, for example if no restrictions $B_k$ are taken into account. Therein, the model f of the target function y contains at least one random influencing variable Z, and the restriction $B_k$ can also be dependent on a random influencing variable Z. Of course, it should be noted that the target function f and the restrictions $B_k$ do not have to contain the same random influencing variable Z.

The random restrictions $$B_k = \sum_{i=1\ldots M} g_k(x_i, \theta_i, Z) \cdot w_{gki}$$

do not have to be integrated as costs in the cost function $c(\theta, Z)$, but could also be taken into account as a stochastic constraints in the optimization. The cost function $c(\theta, Z)$ would then result as $$c(\theta, Z) = \sum_{i=1\ldots M} \{ f(x_i, \theta_i, Z) \cdot w_{fi} \cdot c_f \}$$

wherein the costs $c_f$ can again be defined or predetermined, for example also set to one. As a stochastic constraint, the restrictions $B_k$ can, for example, be used to require that the probability W of reaching a predetermined limit value $G_k$ for the k-th variable to be restricted with the k-th restriction $B_k$ over the load cycle should be limited with a probability bound $W_S$. This can be expressed mathematically in the form $$W\left\{ \sum_{k=1\ldots K} g_k(x_i, \theta_i, Z) \cdot w_{gki} > G_k \right\} \le W_S.$$

It is of course also conceivable that restrictions $B_k$ of specific restricted variables are contained in the cost function $c(\theta, Z)$ and that for other restricted variables with the associated restriction $B_k$ a stochastic constraint is formulated for the optimization.

This cost function $c(\theta, Z)$ is therefore also random and thus cannot be optimized using standard methods.

If the cost function $c(\theta, Z)$ were to be determined multiple times for the same load cycle under the influence of at least one random influencing variable Z which can be modeled with a probability distribution, a statistical distribution (probability distribution) of the cost function $c(\theta, Z)$ would be obtained because the random influencing variables Z are stochastic. The resulting probability distribution can be represented as a density function P(c) as in FIG. 1. Of course, the same applies analogously to a stochastic constraint, for which a probability distribution also results.

Since the stochastic cost function $c(\theta, Z)$ cannot be optimized directly, according to the invention a risk measure ρ (as a scalar variable) is defined for the stochastic cost function $c(\theta, Z)$. The risk measure ρ of a probability distribution itself is again deterministic and can therefore be optimized. The risk measure ρ is a statistical parameter that characterizes the probability distribution of a random variable, in this case the cost function $c(\theta, Z)$. The risk measure ρ maps the probability distribution to a real number. For the calibration, the risk measure ρ for the stochastic cost function $c(\theta, Z)$ can now be optimized, which can be expressed by $$\theta = \min_{\theta}/\max \rho(c(\theta, Z)).$$

The risk measure ρ is usually minimized. As a result of this optimization, the probability distribution P(c) of the cost function $c(\theta, Z)$ is shaped in the desired manner by the selected risk measure ρ, so that the calibration becomes more robust against random influences. This means that the calibrated control variables θ, as a result of the optimization, better map the uncertainties in the real operation of the technical system 1 and thus provide good output variables over a wider range of conditions during real operation. The optimization of the control variables θ thus becomes more robust against random influences.

Various risk measures ρ are known from statistics, for example the expected value E, the value at risk (VaR), the conditional value at risk (CVaR) or the entropic value at risk (EVaR), to name a few. Of course, other risk measures ρ can also be defined and used.

The expected value is the average value of the random variables. Minimizing the expected value leads to results of which the average density function value is minimal. The other risk measures mentioned are more risk-averse and describe the right tail of the probability distribution of the random variable in different ways, i.e. they describe the probability distribution of the worst outcomes, i.e. those cases in which the random variable to be minimized assumes its greatest values. This is usually precisely the area that is the most significant in the calibration, because it contains the largest outliers of the random variables. By influencing this right tail of the probability distribution, these outliers can be reduced, which is of course advantageous for the real operation of the technical system.

The VaR of a random variable X at the confidence level α is the value which is fallen short of with probability α and which is exceeded with probability 1−α. The VaR is thus the α-quantile of the probability distribution of the random variables X. In other words, the VaR is the smallest value of the random variables X of the (1−α)*100% of the worst realizations or, equivalently, the largest value of the best α*100% realizations of the random variables X. Accordingly, minimizing VaR means minimizing the best α*100% of the realizations of the random variables X.

The CVaR is the expected value E of the random variables X for all values of the random variables X greater than the VaR, or expressed mathematically CVaR(X):=E[X|X≥VaR (X)]. The CVaR is therefore the average value of the area under the probability distribution to the right of the VaR or the average VaR over all confidence levels greater than α.

The minimization of the CVaR is therefore more risk averse and implies the minimization of the average values of the random variables X that exceed the VaR. That means the average worst case is minimized.

The EVaR is motivated by its ability to limit both VaR and CVaR, making the EVaR even more risk averse. The EVaR at the confidence level α is defined as follows, $$EVaR(X) := \inf_{z>0}\left\{z^{-1}\ln\frac{M_X(z)}{1-\alpha}\right\} \text{ where } M_X(z) = E[e^{zX}].$$

Figure 2:
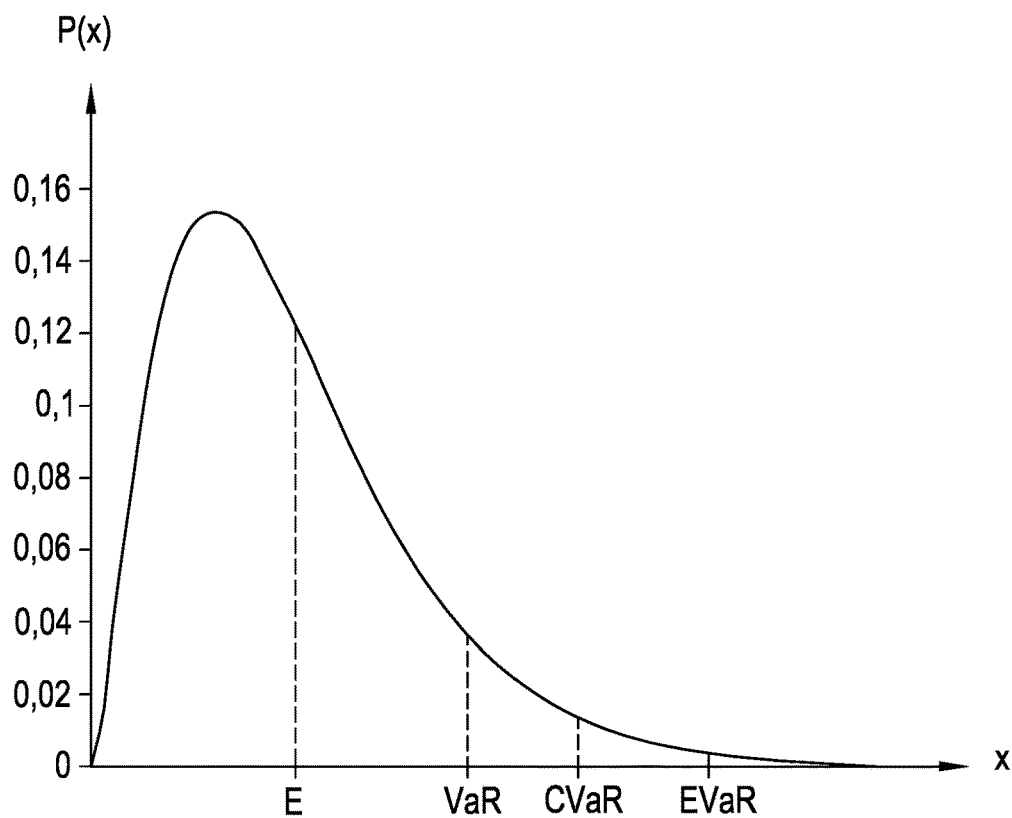
FIG. 2 shows examples of risk measures of a probability distribution.

The above-described risk measures ρ of a random variable X are shown in FIG. 2 using the example of a chi-square distribution as the probability distribution P(X) for explanation.

Which risk measure ρ is used for the optimization can depend on the specifications and circumstances of the calibration, but also on the technical system and the output variable of the technical system to be optimized. If, for example, a good average result is sought, then minimizing the expected value of the probability distribution of the random variables X would be an option. However, this cannot reliably exclude large values of the random variables X (i.e. negative outliers), since the average only means that there are enough small values of the random variables X to compensate for the large values and also for rare extreme outliers. If the right tail of the probability distribution (i.e. where the (extreme) outliers occur) is to be influenced in the calibration, then the VaR, CVaR or EVaR, or other risk measures, are suitable as the risk measure ρ. By selecting the confidence level α, the result of the calibration can also be influenced. By optimizing the VaR, α*100% of the distribution density can be shifted to the left, but (1−α)*100% of the distribution density is not taken into account, which means that the VaR again does not provide any direct control over the extreme outliers. In contrast, the CVaR or EVaR allows the values of the random variable X to be minimized in the case of extreme outliers. Optimizing the CVaR can thus be viewed as optimizing the worst values.

The calibration according to the invention is thus based on a cost function c(θ,Z) which is dependent on at least one control variable θ and at least one random influencing variable Z. This cost function c(θ,Z) is thus the random variable X with a resulting probability distribution P(X) when the cost function c(θ,Z) is realized multiple times. A risk measure ρ is defined for the probability distribution P(X) of the cost function c(θ,Z), which measure is then optimized, usually minimized, by varying the control variables θ.

The cost function c(θ,Z) can be arbitrary and can consider only a single i-th operating point (this is often referred to as local optimization) or simultaneously evaluate multiple operating points. The cost function c(θ,Z) can also evaluate all i operating points simultaneously (this is often referred to as global optimization). The cost function c(θ,Z) can contain a target function y with a model f for the output variable to be optimized and with weightings w. Likewise, the cost function c(θ,Z) can contain restrictions or constraints. The cost function c(θ,Z) can also contain penalty functions φ and/or costs $c_f$, $c_{gk}$.

A load cycle is defined for the calibration according to the invention and the same load cycle is executed multiple times taking into account the at least one random influencing variable Z, and the cost function c(θ,Z) is determined in each case (repeated realization of the cost function c(θ,Z)). If a stochastic constraint of a k-th variable to be restricted is used as described above, the k-th restriction $$B_k = \sum_{i=1\ldots M} g_k(x_i, \theta_i, Z) \cdot w_{gki}$$

is also determined taking into account at least one random influencing variable Z for each realization of the load cycle. This can of course be easily realized if the cost function c(θ,Z) and/or a restriction $B_k$ is defined with a model, for example a model f, $g_k$. The probability distribution of the random influencing variable Z thus influences the value of the cost function c(θ,Z), and possibly also the value of a restriction $B_k$, for the particular execution of the load cycle.

For example, a specific route of a vehicle, for example a journey from point A to point B over a predetermined distance, could be defined as a load cycle. This route could be traveled as often as desired with a vehicle, also with different drivers. In the process, the vehicle experiences different ambient conditions and other random influencing variables Z (such as traffic, specific events, etc.). However, the route could also be traveled only once and parameters describing the route, such as inclination, gradient, slope, curvature of the road, curve radii, distances, intersections with other roads, traffic signs (e.g. speed restrictions), etc., could be recorded. A route described in this way can then be used in a simulation on a simulation unit (hardware and/or software) in order to simulate the journey of a vehicle along the recorded route. In the simulation, parameters of the simulated journey, such as the road condition (wet, snow, ice), weather (wind, rain, snow, etc.), driver characteristics (aggressive driver or conservative driver, braking behavior, etc.), traffic, etc. can be varied randomly. The simulated journey thus always takes place along the same route but under different conditions, which is considered in the simulation by random influencing variables Z with a predetermined probability distribution. For the simulation, however, a route can also be freely defined, for example in a route editor, and does not necessarily have to be obtained from a real journey. Another technical system can of course also be simulated on a simulation unit or operated in real life in order to obtain the multiple realizations of the load cycle.

The characterization of the load cycle naturally also depends on the technical system that is to be calibrated. In the automotive sector, the load cycle is usually a driving cycle, i.e. a specific route that a vehicle (real or simulated) travels. In the case of a machine as a technical system, a load cycle is, for example, a repetitive work sequence, whereby multiple repetitive work sequences can also form the load cycle.

During the execution of the load cycles, the j=1 . . . J state variables ZVj, which characterize the operating point xi, are recorded or supplied from the simulation at predetermined times. In the case of an internal combustion engine, for example, this is the speed and torque of the internal combustion engine, in a hybrid drive train or in an electric vehicle, for example, this is the electric current and electric voltage of the vehicle battery, and in an exhaust gas aftertreatment system, for example, this is the exhaust gas temperature and the exhaust gas mass flow. Depending on the technical system that is to be calibrated, different (also in number) state variables are of course required.

Figure 3:
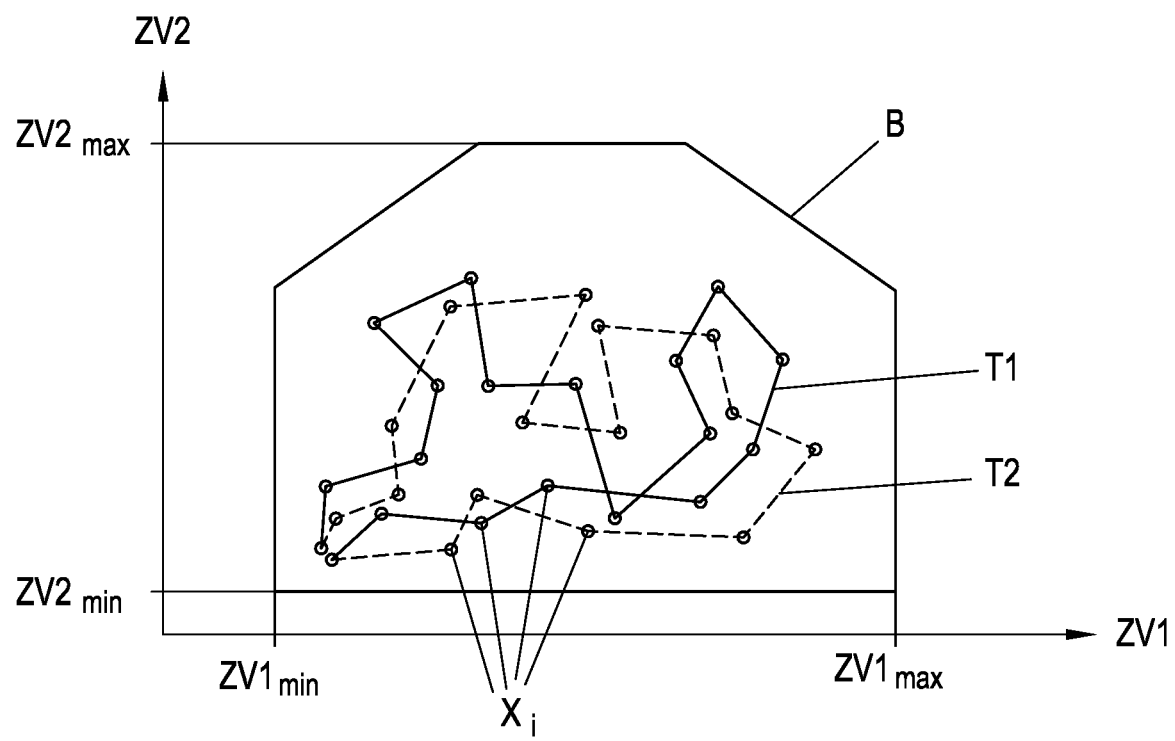
FIG. 3 shows sequences of operating points in the repeated realization of a load cycle with the technical system.

This results in a plurality of realizations of the load cycle which can be represented in the possible operating range B of the technical system, which is spanned by the state variables ZVj (e.g. the torque M and the speed n), as a sequence T1, T2 of operating points $x_i$ as shown in simplified form in FIG. 3 using the example of two realizations. The number i of operating points $x_i$ in each sequence $T_m$ with the number m of realizations naturally depends on how often the state variables ZVj are recorded or determined during the execution and does not have to be the same for each of the sequences $T_m$.

In order to be able to effectively map the influence of the random influencing variables Z on the calibration, a sufficient number of realizations of the load cycle is used. The exact number required cannot be specified because it depends on the particular circumstances, for example on the application, the number of random influencing variables Z, etc. In any case, a good compromise must be sought between informative value and effort. In the case of a model-based cost function $c(\theta,Z)$ it is of course easier to realize a corresponding number of realizations, since this is only a question of computing capacity and computing time.

The at least one random influencing variable Z has an effect on the number i of operating points $x_i$ in the associated sequence T in each realization of the load cycle. The operating points $x_i$ are therefore random in each sequence $T_m$ according to the random influencing variable Z.

Figure 4:
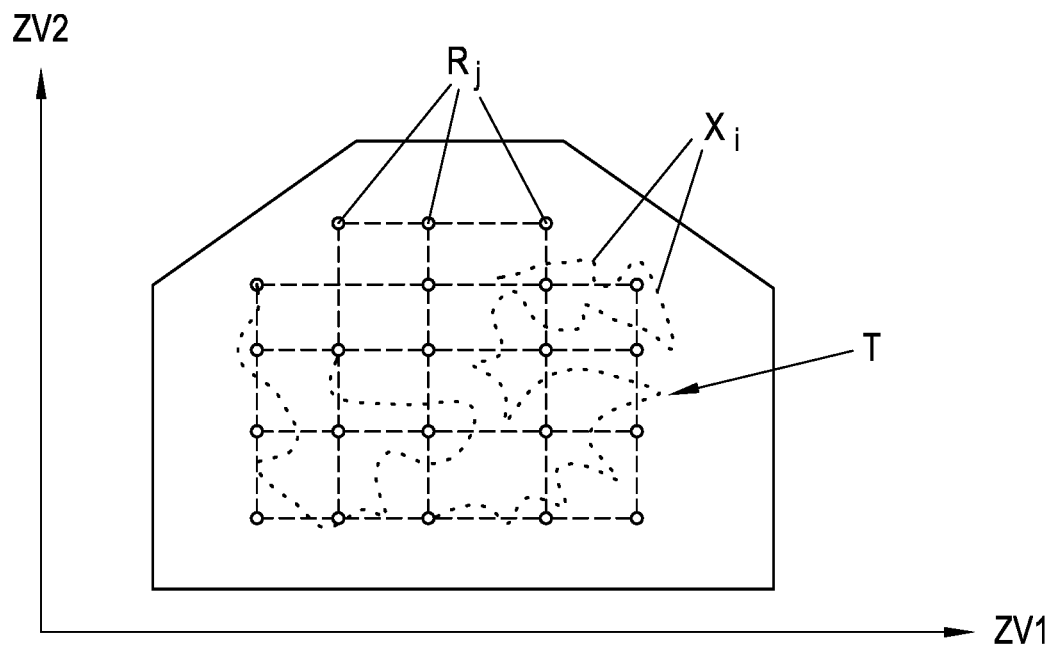
FIG. 4 shows the mapping of the operating points on a predetermined grid.

If the operating points $x_i$ of each sequence $T_m$ are not on a common grid, which will usually be the case, the operating points $x_i$ can first be projected onto a predetermined grid, as explained with reference to FIG. 4, since this simplifies the subsequent calculations. An aggressive driver is likely to complete a specific route faster than a conservative driver, or a route will be traveled more slowly in the rain than in the sunshine. The travel time is therefore different, which for example also leads to different numbers i of operating points $x_i$ in the various realizations.

Therefore, a grid with grid points $R_j$ can be defined in the operating range B (FIG. 4), the grid being arbitrary. The grid does not have to be regular and can be narrower in certain areas of the operating range B than in others, for example in order to better cover the area of particular interest of the operating range B. For example, a specific area of the operating range B could be of particular interest for the emissions and consumption of an internal combustion engine and could therefore be assigned a narrower grid.

Each sequence $T_m$ of operating points $x_i$ of the various realizations of the load cycle can now be projected onto the grid points $R_j$, for example via the Euclidean distance between the operating points $x_i$ and the grid points $R_j$. To this end, each operating point $x_i$ is projected onto the grid point $R_j$ with the smallest Euclidean distance from the operating point. Of course, the projection can also be done differently. There may of course also be grid points $R_j$ onto which no operating point $x_i$ is projected, for example because the sequence $T_m$ does not fully utilize the operating range B. There may also be grid points $R_j$ to which more than one operating point $x_i$ is mapped.

By means of this projection, the weightings $w_{fi}$ and/or $w_{gk}$ of the individual operating points $x_i$ of a sequence $T_m$ can also be determined at the same time, for example as the number of operating points $x_i$ projected onto a specific grid point $R_j$. If no operating point $x_i$ was projected onto a grid point $R_j$, the weighting of zero can also be assigned, or a very small weighting is assigned for it. Of course, the weightings $w_i$ can also be assigned differently.

If the operating points $x_i$ of a sequence are already on a fixed grid, then the projection step, and possibly also the step of assigning weightings, is of course not necessary. If this is not the case and a grid is used, then it should be noted for understanding that the projection reduces the number of operating points $x_i$ of a sequence $T_m$ to the number of grid points $R_j$. For the subsequent optimization, the grid points $R_j$ thus take the place of the operating points $x_i$. For the sake of simplicity, however, reference will still be made to operating points $x_i$.

Control variables $\theta$ are of course required for realizing the load cycle. In the case of a real journey with a vehicle, the control variables required for the journey must of course be stored. The same naturally applies to a simulation of the load cycles. These initial control variables are known or predetermined. For example, a conventional calibration according to the prior art, i.e. without random influencing variables, could first be carried out in order to determine the initial control variables. Alternatively, the at least one initial control variable could also simply be assumed or plausibly set.

If, with given initial control variables, the cost function $c(\theta,Z)$, and possibly also a k-th restriction $B_k$ were now determined over the load cycle on a computing unit under the influence of the at least one random influencing variable Z for each realization of the load cycle (sequences $T_m$), a probability distribution would result, e.g. as shown in FIG. 1. The invention now aims to influence the resulting probability distribution P of the cost function $c(\theta,Z)$ in a targeted manner by optimizing a defined risk measure $\rho$ of the probability distribution P of all realizations of the load cycle, which can be written mathematically in the form $\theta=\min/\max \rho(c(\theta,Z))$. In other words, the control variables $\theta$ are varied so as to result in a probability distribution P(c) of the cost function $c(\theta,Z)$ of all realizations of the load cycle that has the desired risk measure $\rho$, for example a minimum expected value E, a minimum VaR, CVaR or EVaR. If necessary, compliance with a stochastic constraint, for example of the type $$W\left\{\sum_{k=1\ldots K} g_k(x_i, \theta_i, Z) \cdot w_{gki} > G_k\right\} \leq W_S,$$

is checked. The cost function $c(\theta,Z)$, and possibly a k-th restriction $$B_k = \sum_{i=1\ldots M} g_k(x_i, \theta_i, Z) \cdot w_{gki},$$

can be calculated on a computing unit for given operating points $x_i$ and specific control variables $\theta$ (which are varied in the optimization) so that the variation can be carried out easily.

The optimization is trivial in the case of the expected value E, because only the average of the occurring values of the cost function $c(\theta,Z)$ has to be minimized. For simple cost functions $c(\theta,Z)$, the probability distribution and specific risk measures $\rho$ can be calculated and analytically optimized in a known manner. For more complex cost functions $c(\theta,Z)$, on the other hand, an analytical solution to the optimization is not possible or only possible with great effort and the risk measures $\rho$ are approximated using suitable methods, for example Monte Carlo methods. Appropriate methods are also known and available for this purpose, however. Equivalent optimization problems are also known in order to optimize specific risk measures $\rho$. For example, the CVaR can be obtained in an equivalent manner from the optimization problem $$\min_{\theta,\zeta \in \mathbb{R}} \left\{ \zeta + \frac{1}{1-\alpha} E[(c(\theta, Z) - \zeta)^+] \right\}.$$

This again contains the confidence level α and the following applies: $[h]^+ = \max\{0, h\}$. The ζ optimized in this way then corresponds to the CVaR. There is also an equivalent optimization problem for the EVaR in the form $$\min_{\theta, t>0} \{ t \ln M_{c(\theta,Z)}(t^{-1}) - t \ln(1-\alpha) \}$$

where $M_X(z) = E[e^{zX}]$. The t optimized in this way then corresponds to the EVaR.

To solve the above optimization problems, appropriate solution algorithms are available that can be executed as software on a computing unit (hardware).

Non-stochastic boundary conditions and/or constraints can also be taken into account in the calibration in a well-known manner in addition or as an alternative to a stochastic restriction, for example of the kind $$W \left\{ \sum_{k=1...K} g_k(x_i, \theta_i, Z) \cdot w_{gki} > G_k \right\} \leq W_S.$$

Typical non-stochastic boundary conditions are predetermined upper and/or lower limit values for permissible values for the number of control variables θ.

In connection with the calibration of a technical system, characteristic maps of the control variables θ over the operating range B are often created. It is usually desirable that the characteristic maps are smooth over the operating range and the gradient between two points on the characteristic map is limited. If $x_a$ and $x_b$ are two adjacent operating points of a characteristic map for a control variable θ, then, for example, a non-stochastic constraint of the type $$\frac{|\theta_a - \theta_b|}{\|x_a - x_b\|_2} \leq k^{max}$$

the type with the Euclidean norm $\| \ \|_2$ can be formulated which limits the gradient between the adjacent points of the characteristic diagram with a gradient limit value $k^{max}$. Of course, different gradient limit values $k^{max}$ can also be specified over the operating range B.

To solve the optimization problem, for example, for each realization of the load cycle, i.e. for each sequence $T_m$ of the operating points $x_i$ (if necessary projected onto the grid points $R_j$), the defined cost function c(θ,Z) for given control variables θ can be calculated on a computing unit. In the case of a stochastic constraint with a random restriction of a k-th restricted variable over the load cycle, the k-th restriction $B_k$ is also determined over the load cycle, for example as $$\sum_{i=1...M} g_k(x_i, \theta_i, Z) \cdot w_{gki}.$$

This leads to a probability distribution P(c) of the cost function c(θ,Z) for which the intended risk measure ρ is also calculated on a computing unit, either analytically or by approximation. In the same way, if necessary, the probability distribution of the k-th restriction $B_k$ is also obtained, which can be used to determine the probability W that the restriction $B_k$ exceeds the limit value $G_k$, and the compliance with the probability bound $W_S$ is also obtained. Then, for optimization, the at least one control variable θ is varied (i.e. changed), possibly taking into account predetermined non-stochastic boundary and constraints and/or stochastic constraints, and the risk measure ρ of the resulting probability distribution P(X) is determined again until the risk measure ρ is optimized, usually minimized. This means that only a new control variable θ that does not lead to a violation of a boundary condition or constraint is selected for the next iteration. A suitable abort criterion can be provided for the optimization, for example a number of iterations or a defined maximum difference between the risk measures ρ of two successive iterations. The last step is also carried out on a computing unit with appropriate software.

Figure 6:
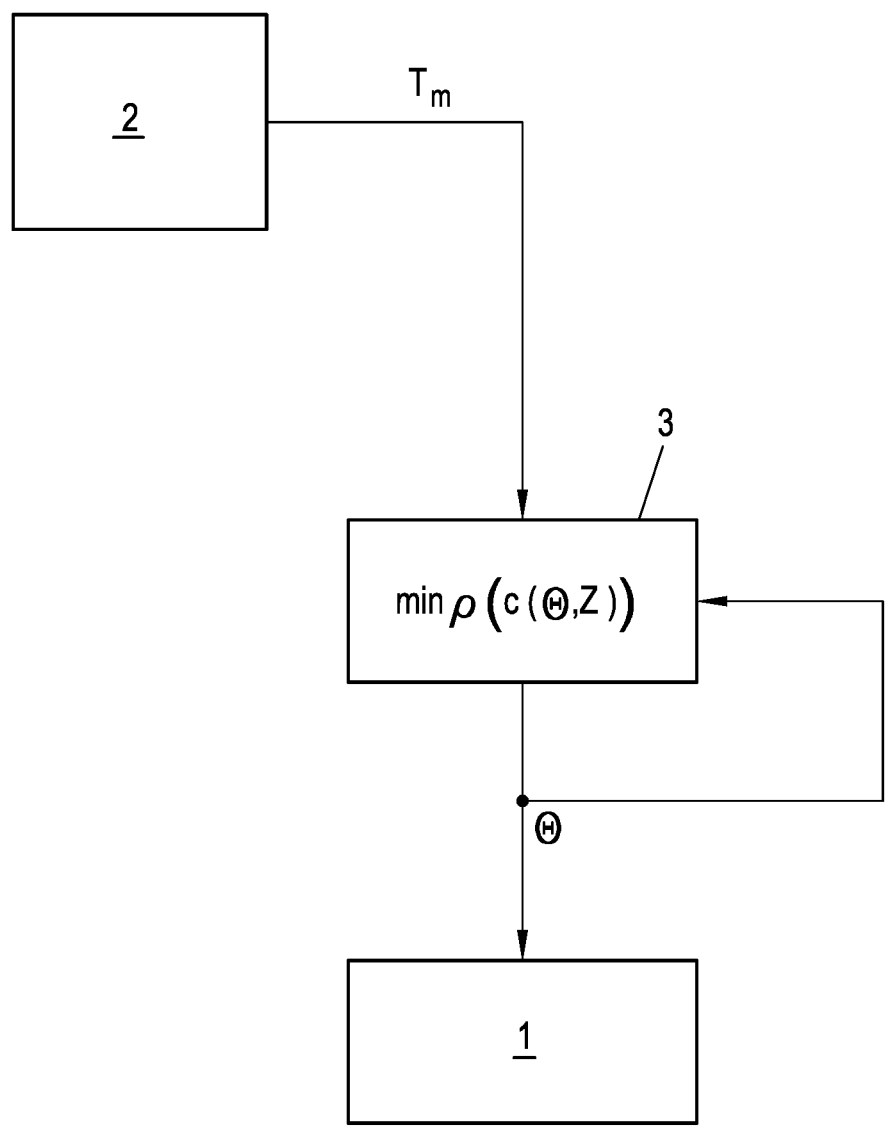

This is shown schematically in FIG. 6 on the basis of an exemplary embodiment. In a simulation unit 2, the technical system is simulated multiple times for a predetermined load cycle, taking into account a random influencing variable Z, in order to obtain the sequence $T_m$ of the operating points $x_i$. These are transferred to a computing unit 3, wherein the simulation unit 2 and the computing unit 3 can also be implemented on common hardware. The calibration is implemented in the computing unit 3, which calculates the risk measure ρ in each iteration step with the respective control variables θ and varies the control variables until the abort criterion is reached. The last control variables θ are then transferred as optimized control variables $\theta_{opt}$ to the technical system 1 in order to regulate, control or tune the technical system 1 therewith.

The result of the calibration according to the invention is explained with reference to FIG. 5. For this purpose, a calibration of a technical system was first carried out as described above. The calibration took place with respect to the different risk measures ρ mentioned as examples, i.e. E, VaR, CVaR and EVaR. Each calibration led to different optimal control variables θ with which the technical system is operated. In order to illustrate the influence of the different risk measures ρ, a number of further realizations of the load cycle were carried out, taking into account random influencing variables Z and with the respective optimal control variables θ as described above. The load cycle was thus practically carried out multiple times again on the technical system with the permutation of different variables (random influencing variable Z). For each sequence T of operating points $x_i$ determined for this purpose, the cost function c(θ,Z), which was also used for the calibration, was calculated with the different control variables θ. This resulted, with the new realizations of the load cycle for each set of control variables θ (calculated using the different risk measures ρ), in a probability distribution P(c). These distributions are shown in FIG. 5b) to e). As a comparison, the calibration was also carried out using only a single realization of the load cycle, as has been the practice in the past. The control variables θ for the technical system were also determined for this purpose. The cost function c(θ,Z) for the new realizations of the load cycle was also determined for the technical system calibrated in this way, which led to the probability distribution P(c) in FIG. 5a).

The first thing that stands out in FIG. 5 is the resulting different probability distributions. The probability distribution P(c) in FIG. 5a) has a significantly larger variance and a more pronounced right tail compared to the remaining probability distributions. This means that the cost function c(θ,Z) varies in a substantially wider range and that there are also more negative outliers in the right tail.

Figure 5A:
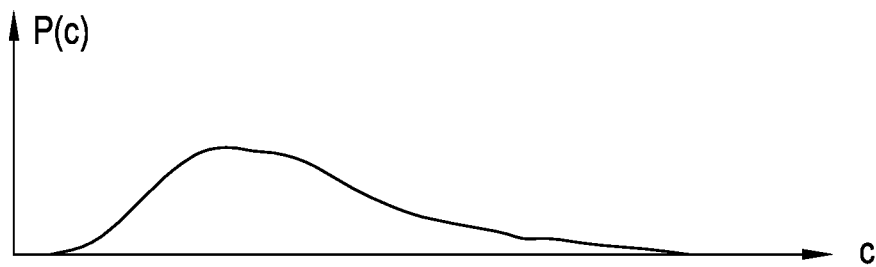
FIG. 5 shows the probability distributions resulting from the optimization of different risk measures and FIG. 6 shows a possible implementation of the calibration according to the invention.
Figure 5B:
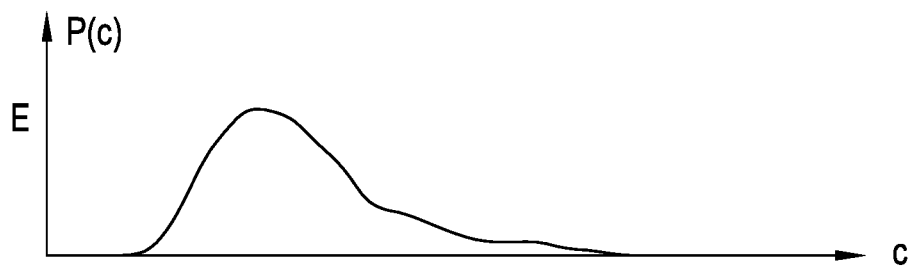
Figure 5C:
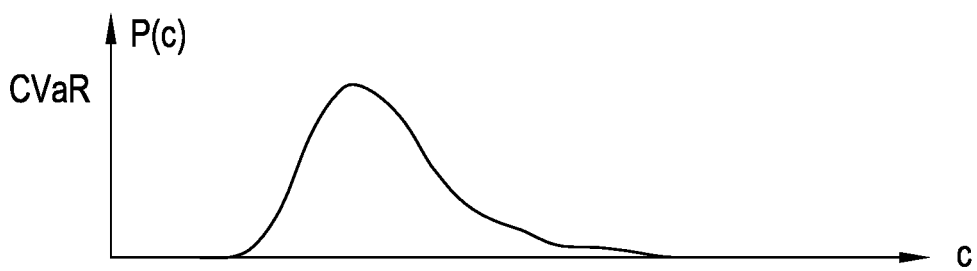
Figure 5D:
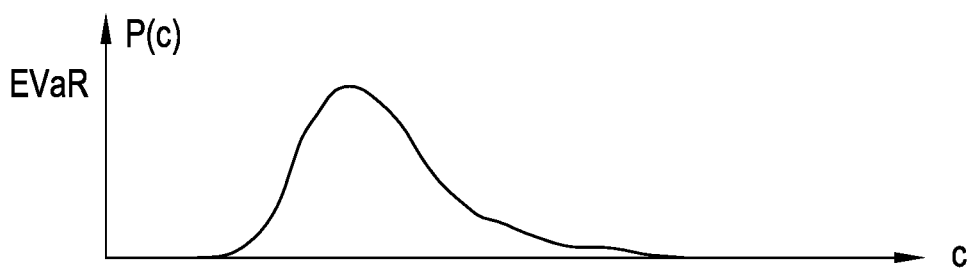
Figure 5E:
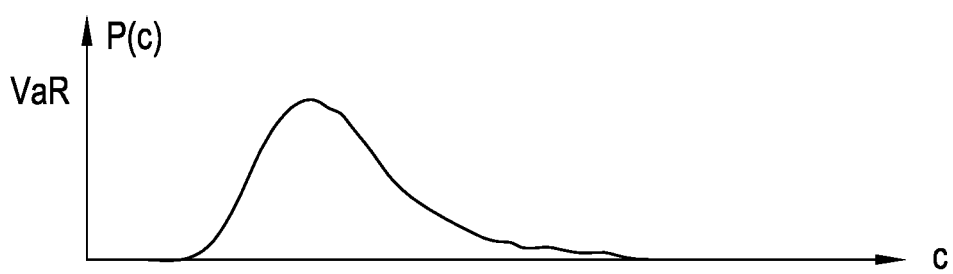

In the case of the expected value E as the risk measure ρ (FIG. 5 b)), the mass of the probability distribution P(c) of the cost function c(θ,Z) has shifted to the left compared to the distribution according to FIG. 5a) and the probability distribution P(c) has the smallest expected value E (average value of the cost function c(θ,Z)).

The result for the CVaR (FIG. 5c)) and the EVaR (FIG. 5d)) are similar in this example and are qualitatively almost equivalent. It can be seen that the mass of the values of the cost function c(θ,Z) has been shifted to the right, but the right tail is significantly less pronounced. This means that with this risk measure ρ control variables α were found that lead to higher average values of the cost function c(θ,Z), but to smaller values of the cost function c(θ,Z) in the area of the most negative outliers (right tail). This also reduced the negative outliers, both in number and in the amount of the values of the outliers.

The result for VaR (FIG. 5 e)) lies somewhere between the result for the expected value E and the results for CVaR and EVaR. The average value of the cost function c(θ,Z) is somewhat lower than for CVaR and EVaR, but the right tail is somewhat more pronounced.

This also makes it clear that, for a calibration according to the invention, the risk measure ρ should advantageously be selected according to the requirements. In applications in which certain limits should preferably not be exceeded, the CVaR or EVaR with a suitably chosen confidence level α is advantageous because the outliers are then limited. If, on the other hand, the occasional exceeding of limits is not a problem, then the expected value E can also be selected as the risk measure ρ.

The optimization, or calibration, can be carried out on a suitable computing unit (hardware and software) with calibration software that executes the steps explained above. The calibration according to the invention is thus a computer-implemented method that is executed on at least one computing unit.

The number of realizations of the load cycle (sequences $T_m$) can be determined in advance. They therefore only have to be determined once for the calibration since, for the optimization to be carried out, only the value of the cost function c(θ,Z), and if necessary the value of the k-th restriction $B_k$, for example as $$\sum_{i=1 \ldots M} g_k(x_i, \theta_i, Z) \cdot w_{gki},$$

over the load cycle, has to be recalculated for these realizations and the changed control variable θ.

As explained above, the cost function c(θ,Z) can contain at least one model f, $g_k$ of an output variable of the technical system. The model f, $g_k$ of the output variable can now also be trained in parallel with the optimization. For this purpose, it is also possible to operate the technical system with the calibrated control variables θ on a test bench and to record measurement data on the output variables in the process. The model f, $g_k$ can be trained with these recorded output variables in order to increase the accuracy of the model f, $g_k$. The optimization can be repeated with the improved model f, $g_k$, which in turn leads to improved calibration results. Thus, over time, more and more reliable models f, $g_k$ are obtained and, subsequently, more and more reliable optimization results for the control variable θ are obtained. However, the training of the model f, $g_k$ does not have to take place in parallel with the calibration but can also be carried out separately.

The invention claimed is:

1. Method for calibrating a technical system including the steps of:
    determining the values of a number of control variables of the technical system, with which the technical system is controlled or tuned, at specific operating points of the technical system,
    carrying out the calibration on the basis of a load cycle for the technical system which results in a sequence of a number of operating points of the technical system,
    executing the load cycle multiple times under the influence of at least one random influencing variable, with each realization of the load cycle resulting in a random sequence of the number i of operating points,
    defining a cost function which contains a target function y with a model f for an output variable of the technical system, the model f being dependent on the number of control variables of the technical system and on the number i of random operating points of the technical system so that the value of the cost function for each realization of the load cycle is itself a random variable that has a probability distribution,
    defining a risk measure p of the probability distribution, with which the probability distribution is mapped to a scalar variable, and
    optimizing the risk measure ρ by varying the number of control variables in order to obtain the optimal control variables for calibration.

2. The method according to claim 1, further including the step of simulating the load cycle multiple times under the influence of the at least one random influencing variable in order to obtain the random sequences of the number i of operating points.

3. The method according to claim 1, further including the step of operating the technical system multiple times for the load cycle under the influence of the at least one random influencing variable in order to obtain the random sequences of the number i of operating points.

4. The method according to claim 1, further including the step of weighting a model value of the model f in the target function y with a predetermined weighting wfi and/or with predetermined costs cf.

5. The method according to claim 1, wherein the step of defining the cost function further includes taking into account at least one restriction Bk with a model gk for an output variable of the technical system in the cost function, and wherein the model gk is dependent on the number of control variables of the technical system and on the number i of random operating points of the technical system.

6. The method according to claim 5, further including the step of weighting a model value of the model gk of the at least one restriction Bk with a predetermined weight wgk and/or with predetermined costs cgk.

7. The method according to claim 5, further including the step of evaluating a violation of a restriction Bk with a predetermined penalty function φ.

8. The method according to claim 1, wherein the step of optimizing further includes taking into account a stochastic constraint for at least one restriction Bk with a model gk for an output variable of the technical system, wherein the model gk is dependent on the number of control variables of the technical system and on the number i of random operating points of the technical system.

9. The method according to claim 8, further including the steps of
    determining the probability W that the stochastic constraint exceeds a predetermined limit value Gk, and
    comparing the probability W to a predetermined probability bound WS.

10. The method according to claim 1, wherein the step of optimizing further includes varying iteratively the number of control variables and determining again the probability distribution of the cost function until the risk measure p of the probability distribution is optimized.

11. The method according to claim 1, wherein the step of optimizing further includes taking into account a non-stochastic boundary condition and/or constraint for the number of control variables.

* * * * *